United States Patent [19]

Oda et al.

[11] Patent Number: 5,068,570
[45] Date of Patent: Nov. 26, 1991

[54] LAMP LIGHTING CIRCUIT WITH AN OVERLOAD PROTECTION CAPABILITY

[75] Inventors: Goichi Oda; Masaya Shidoh; Atsushi Toda; Akiyoshi Ozaki; Akihiro Matsumoto; Soichi Yagi; Atsuhiko Murata, all of Shimizu, Japan

[73] Assignee: Koito Manufacturing Co., Ltd., Shizuoka, Japan

[21] Appl. No.: 469,876

[22] Filed: Jan. 24, 1990

[30] Foreign Application Priority Data

Jan. 26, 1989 [JP] Japan .................................. 1-16574
Dec. 7, 1989 [JP] Japan .................................. 1-318481

[51] Int. Cl.⁵ ........................................... H05B 41/00
[52] U.S. Cl. ............................. 315/128; 315/DIG. 7; 315/360; 315/119
[58] Field of Search .................. 315/128, DIG. 7, 362, 315/360, 225, 119; 328/8

[56] References Cited

U.S. PATENT DOCUMENTS

| | | | |
|---|---|---|---|
| 3,197,674 | 7/1965 | Hellman | 328/8 |
| 3,801,794 | 4/1974 | Mauch | 315/362 |
| 4,207,500 | 6/1980 | Duve | 315/362 |
| 4,240,009 | 12/1980 | Paul | 315/244 |
| 4,337,418 | 6/1982 | Walz | 315/362 |
| 4,450,384 | 5/1984 | Krokaugger | 315/225 |
| 4,667,131 | 5/1987 | Nilssen | 315/225 |
| 4,724,360 | 2/1988 | Luursema | 315/224 |
| 4,763,044 | 8/1988 | Nuckolls | 315/225 |
| 4,766,350 | 8/1988 | Hüsgen | 315/DIG. 7 |
| 4,797,599 | 1/1989 | Ference | 315/225 |

Primary Examiner—Eugene R. LaRoche
Assistant Examiner—Zarabian A.
Attorney, Agent, or Firm—Sughrue, Mion, Zinn Macpeak & Seas

[57] ABSTRACT

A lighting circuit for a metallic halide lamp for vehicular headlight applications is disclosed. Included are a pair of input terminals between which a battery is connected for feeding the lamp via a normally open relay switch which is closed upon energization of an associated relay coil. The relay coil is connected in series with an operator actuated lamp switch and a protection switch, so that both lamp switch and protection switch must be closed to energize the relay coil and hence to close the relay switch. The protection switch is automatically opened to deenergize the relay coil when the battery develops overvoltage or when the lamp will not glow upon closure of the lamp switch. In an alternate embodiment, the protection switch is also opened in response to the development of overcurrent or overvoltage by a d.c. voltage booster circuit included in the lighting circuit.

17 Claims, 5 Drawing Sheets

LAMP LIGHTING CIRCUIT WITH AN OVERLOAD PROTECTION CAPABILITY

BACKGROUND OF THE INVENTION

This invention relates to an electric circuit for lighting a lamp or lamps such as, typically, metallic halide lamps or like discharge lamps used on motor vehicles. More particularly, the invention deals with such a lamp lighting circuit featuring provisions for automatically disconnecting the lamp from the power supply in the event of abnormal circuit conditions such as caused by a lamp failure or an excessive supply voltage.

Incandescent lamps such as halogen-cycle lamps have long been the standard light sources of automotive headlamp assemblies. The known lighting circuit for such incandescent headlamps has been of very simple design, with the lamps connected to a battery via relay contacts and with a lamp switch connected to the battery via the relay coil. No means for circuit protection from overload have usually been incorporated with the lighting circuit.

A variety of troubles unavoidably develop in the vehicular lighting circuit. Such troubles include, for example, those brought about at or toward the end of the service life of the light bulbs, and battery overvoltage. Or the battery may be connected to the lighting circuit in the wrong polarity. The worst possible outcome of these troubles in the conventional lighting circuit for incandescent headlamps has been the breakage of the lamp filaments. Overload protection means have therefore been not an absolute necessity.

Recent years, however, have witnessed the advent of metallic halide lamps as the light sources of vehicle headlamp assemblies in substitution for incandescent lamps as typified by halogen lamps. This new type of discharge lamp requires a starting voltage of as high as 10 to 20 kilovolts in order to be instantly lit up for proper functioning as vehicle headlamps. Such high voltage can be a cause of serious consequences without overvoltage protection.

Should the lamp fail to glow for its own trouble upon actuation of the lamp switch, the high voltage would continue developing between the output terminals of the lighting circuit in the absence of overload protection means. The unconsumed high voltage might disrupt the insulations between the contacts within the lamp sockets. The possible result might be a fire. Or the user might be struck by the high voltage in an inadvertent attempt to replace the lamps. Battery overvoltage, and battery connection in the wrong polarity, might also ruin the circuit elements, possibly resulting in the development of dangerously high output voltage and in the eventual destruction of the lamps.

The lighting circuit for metallic halide lamps has had additional causes of trouble in connection with the d.c. voltage booster circuit incorporated therein for controllably elevating the battery voltage prior to conversion into a.c. voltage required by the metallic halide lamps. The booster circuit is prone to develop overvoltage or overcurrent in response to various abnormal circuit conditions. The lighting circuit and the lamps must also be protected against such booster overvoltage and overcurrent.

SUMMARY OF THE INVENTION

The present invention aims at the provision of a novel lamp lighting circuit effectively protected against troubles that may arise in use of lamps notably including metallic halide lamps for vehicular headlight applications.

Briefly, the invention may be summarized as a lamp lighting circuit for connection between a power supply and an electric lamp, comprising a pair of input terminals between which the power supply is to be connected, and a pair of output terminals between which the lamp is to be connected. One of the input terminals is also connected to an operator actuated lamp switch and, in series therewith, a protection switch. A circuit breaker is connected between the input and output terminals and also connected to the protection switch for permitting the power supply to power the lamp when both the lamp switch and the protection switch are closed. Also connected to the protection switch is one or more detector means for opening the same in response to a prescribed abnormal circuit condition or conditions, so that the circuit breaker electrically disconnects the power supply from the lamp when the abnormal circuit condition or conditions occur.

In one preferred embodiment of the invention disclosed herein, the protection switch is opened when the lamp remains unlit for a prescribed time following the closure of the lamp switch, and when the output voltage of the power supply exceeds a predetermined value. The protection switch is also left open when the lamp switch is closed with the battery connected in the wrong polarity between the pair of input terminals. In another preferred embodiment the protection switch is additionally opened upon development of overcurrent or overvoltage by a voltage booster circuit included in the lighting circuit. Thus the invention overcomes all the noted difficulties and inconveniences heretofore encountered in the art.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

General

Figure 1:
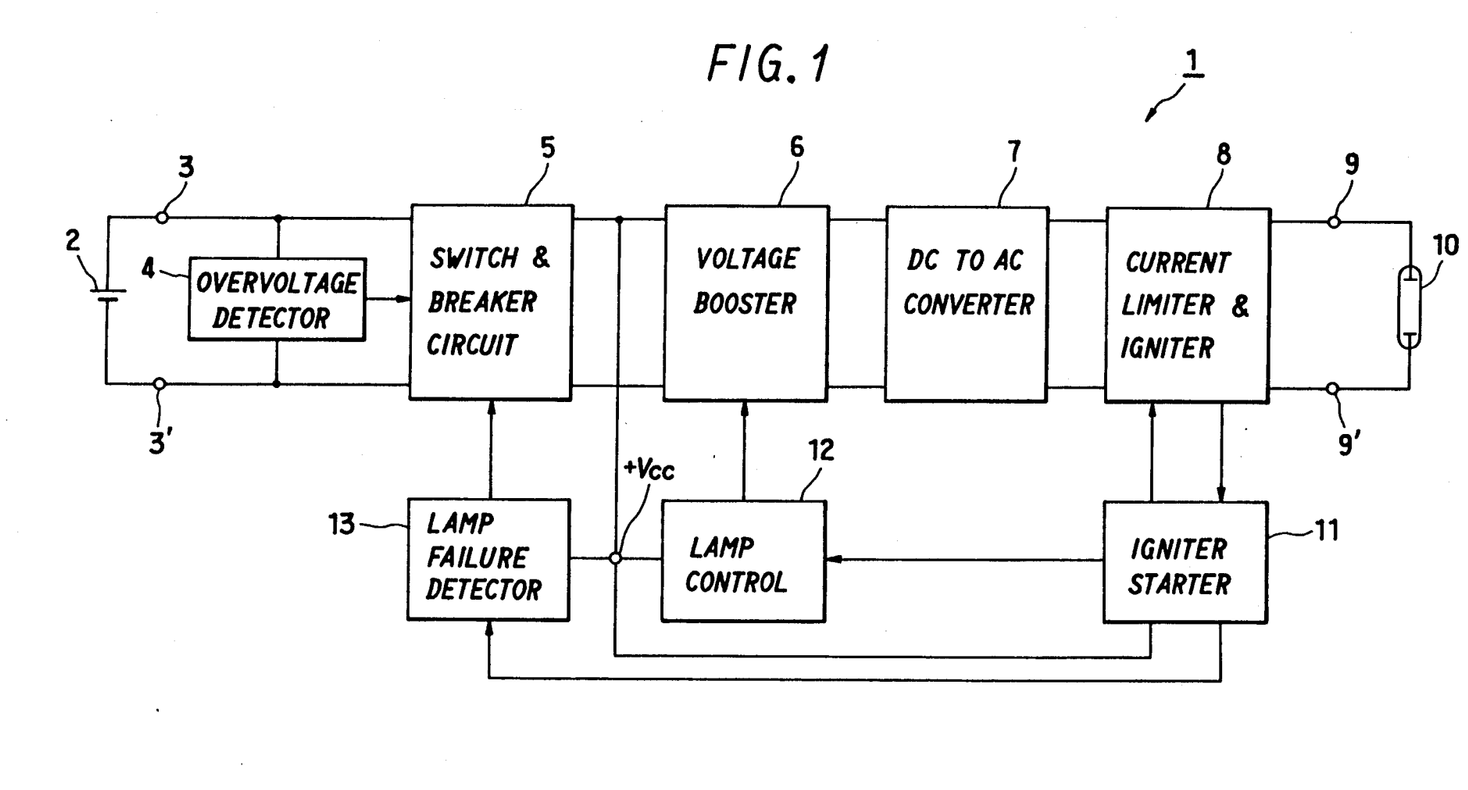
FIG. 1 is a block diagram of the lamp lighting circuit embodying the principles of the invention.
Figure 2:
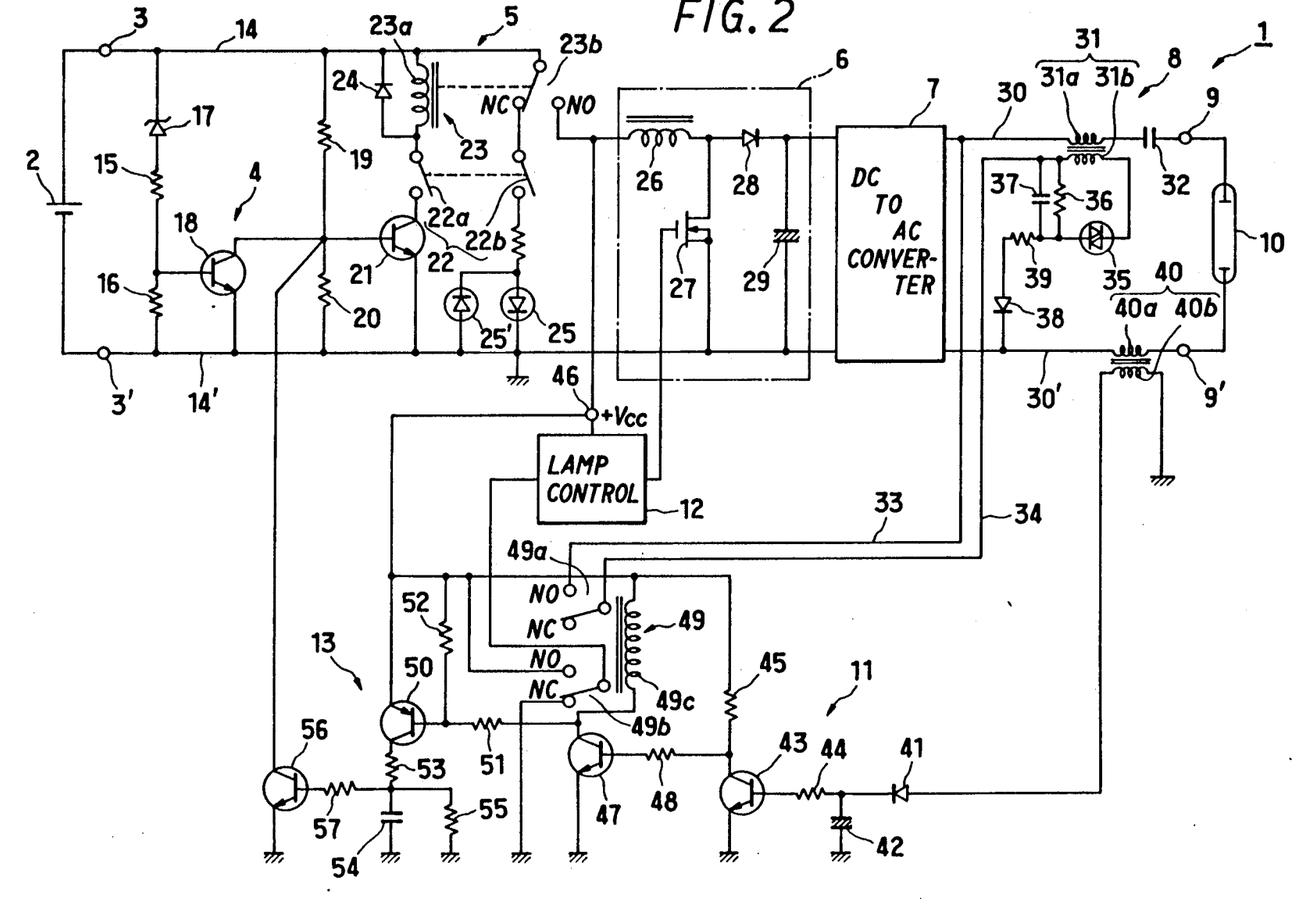
FIG. 2 is a schematic electrical diagram showing the lamp lighting circuit of FIG. 1 in more detail.

The lamp lighting circuit of this invention will now be described in terms of its first preferred form shown in FIGS. 1 and 2, in which the lighting circuit is shown adapted for a metallic halide lamp on a motor vehicle. Reference is first directed to FIG. 1 for a consideration of the general configuration of the exemplified lamp lighting circuit.

Generally designated 1, the lamp lighting circuit has a d.c. power supply herein shown as a battery 2 with an output voltage of, typically, 12 volts. The battery 2 has its positive and negative poles connected to a pair of input terminals 3 and 3', respectively, of the lighting circuit 1.

Connected between the pair of input terminals 3 and 3' are a overvoltage detector circuit 4 and a lamp switch and circuit breaker circuit 5, the latter being hereinafter referred to as the switch and breaker circuit. The overvoltage detector circuit 4 signals the switch and breaker circuit 5 when the battery voltage exceeds a threshold value. The switch and breaker circuit 5 comprises an operator actuated lamp switch and a circuit breaker. The circuit breaker opens the lighting circuit in response to the overvoltage signal from the overvoltage detector circuit 4, as well as to a lamp failure signal from a lamp failure detector circuit yet to be described.

A d.c. voltage booster circuit 6 is connected to the output side of the switch and breaker circuit 5 for boosting the battery voltage. The magnitude of the d.c. output voltage from this booster circuit is under the control of a lamp control circuit to be subsequently referred to.

A d.c.-to-a.c. converter circuit 7 is connected next to the d.c. voltage booster circuit 6. The converter circuit 7 translates the d.c. output voltage of the booster circuit 6 into a sinusoidal a.c. voltage.

The converter circuit 7 is connected to a current limiter and lamp igniter circuit 8, which in turn is connected to a pair of output terminals 9 and 9' having a metallic halide lamp 10 replaceably connected therebetween.

An igniter starter circuit 11 is also connected to the current limiter and lamp igniter circuit 8. Inputting information representative of lamp current from the current limiter and lamp igniter circuit 8, the igniter starter circuit 11 acts on the igniter section of the circuit 8 for controlling starting pulses and also delivers a timing signal to a lamp control circuit 12.

The lamp control circuit 12 sets up one of several prescribed lamp control modes in accordance with the length of time during which the lamp 10 has been unlit and delivers to the booster circuit 6 a control signal required for instantly lighting up the lamp. The control signal causes the booster circuit 6 to increase the battery voltage to a variable degree. As the magnitude of the d.c. input voltage to the converter circuit 7 is thus varied, so is the magnitude of the current fed to the lamp 10.

A lamp failure detector circuit 13 detects a lamp failure by computing the length of time during which the lamp 10 remains unlit following the closure of the lamp switch included in the switch and breaker circuit 5. When this unlit length of time exceeds a predefined limit, the lamp failure detector circuit 13 signals the switch and breaker circuit 5 for causing the same to open the lighting circuit.

The following is a more detailed description of the noted overvoltage detector circuit 4, switch and breaker circuit 5, d.c. voltage booster circuit 6, d.c.-to-a.c. converter circuit 7, current limiter and lamp igniter circuit 8, igniter starter circuit 11, lamp control circuit 12 and lamp failure detector circuit 13, in that order and under separate headings. The operational description of the complete lighting circuit 1 will follow the detailed description of the listed circuit components. Reference may be had to FIG. 2 for all such description.

Overvoltage Detector Circuit

The overvoltage detector circuit 4 includes a serial connection of a first 15 and a second 16 resistor. The first resistor 15 is connected to a positive supply line 14 via a Zener diode 17 whereas the second resistor 16 is connected directly to a negative supply line 14'. The Zener diode 17 has its cathode connected to the positive supply line 14 and its anode to the first resistor 15.

The overvoltage detector circuit 4 also includes an npn switching transistor 18. The base of this transistor is connected to the interconnection between the resistors 15 and 16, and its emitter to the negative supply line 14'.

Lamp Switch and Circuit Breaker Circuit

The switch and breaker circuit 5 includes a first 19 and a second 20 resistor connected in series between the pair of supply lines 14 and 14' for voltage division. The interconnection between these voltage dividing resistors is connected to the collector of the switching transistor 18 of the overvoltage detector circuit 14.

Also, the interconnection between the voltage dividing resistors 19 and 20 is connected to the base of another npn switching transistor 21. The emitter of the transistor 21 is connected to the negative supply line 14', and its collector to an operator actuated lamp switch 22.

It will be noted that the lamp switch 22 is of the double pole, single throw design, comprising a first 22a and a second 22b contact pair. The collector of the transistor 21 is connected to the first contact pair 22a of the lamp switch 22 and thence to one extremity of the coil 23a of a relay 23 employed as a circuit breaker. The other extremity of the relay coil 23a is connected to the positive supply line 14. A diode 24 is connected in parallel with the relay coil 23a. The relay 23 has a switch 23b which is actuated by the relay coil 23a and which comprises a movable contact connected to the positive supply line 14, a first fixed contact NC and a second fixed contact NO.

Normally, or when the two contact pairs 22a and 22b of the lamp switch 22 are both open as shown, the relay coil 23a is unenergized, with the result that the movable contact of the relay switch 23b engages the first fixed contact NC. The relay coil 23a becomes energized upon closure of the lamp switch 22, provided that the transistor 21 is conductive. The energized relay coil 23a causes the movable contact of the relay switch 23b to move into engagement with the second fixed contact NO.

It will therefore be understood that the circuit breaker constituted of the relay 23 holds the lighting circuit 1 closed only when the lamp switch 22 is closed and, at the same time, when the transistor 21 is conductive. Stated conversely, the circuit breaker opens the lighting circuit when the transistor 21 is turned off, even if the lamp switch 22 is held closed. Thus, in this embodiment, both overvoltage detector circuit 4 and lamp failure detector circuit 13 are connected to the base of the transistor 21 in order to cause the lighting circuit 1 to be opened by the relay 23 in the event of battery overvoltage or lamp failure. The transistor 21 may therefore be termed a protection switch. Connected in series with the contact pair 22a of the lamp switch 22, the protection switch 21 is normally closed to permit the relay coil 23a to be energized from the battery 2. When signaled to open by either the overvoltage detector circuit 4 or lamp failure detector circuit 13, the protection switch 21 causes deenergization of the relay coil 23a and, in consequence, the opening of the lighting circuit 1.

At 25 and 25' are seen a first and a second light emitting diode (LED) as warning light source means. The first LED 25 has its anode connected to the first fixed contact NC of the relay switch 23b via a resistor and the second contact pair 22b of the lamp switch 22. The cathode of the first LED 25 is connected to the negative supply line 14'. The second LED 25' is connected in parallel with the first LED 25, with their polarities reversed.

D.C. VOLTAGE BOOSTER CIRCUIT

Generally shown as a chopper type d.c. to d.c. converter, the booster circuit 6 includes an inductor 26 having one extremity connected to the second fixed contact NO of the relay switch 23b. The other extremity of the inductor 26 is connected to both an n channel field effect transistor (FET) 27 and a rectifier diode 28. This rectifier diode has its anode connected to the drain of the FET. 27. The gate of the FET 27 is connected to the control circuit 12, and its source to the negative supply line 14'. A smoothing capacitor 29 is connected between the cathode of the rectifier diode 28 and the negative supply line 14'.

Such being the construction of the booster circuit 6, the inductor 26 stores energy when the FET 27 is conductive in response to a control pulse from the lamp control circuit 12. Upon nonconduction of the FET 27 the inductor 26 releases the stored energy, with the consequent superposition of the corresponding voltage on the input voltage, thereby building up the d.c. voltage.

D.C. to A.C. Converter Circuit

The converter circuit 7 functions to translate the d.c. output voltage of the booster circuit 6 into a corresponding sinusoidal a.c. voltage. This circuit 7 is shown in block form as it can be of any known or suitable construction capable of performing the noted function. For example, it may be a self excited inverter circuit based on inductance capacitance resonance.

In the case of push pull inverter construction, the converter circuit 7 comprises a transformer having a primary winding with a center tap connected to the positive output line of the booster circuit 6 via a choke coil. Between the opposite extremities of the transformer primary there are connected a capacitor and, in parallel therewith, two active switching elements such as transistors. As these switching elements are oppositely turned on and off by a feedback winding connected to the transformer primary, a sinusoidal high frequency voltage can be obtained between the opposite extremities of the transformer secondary.

Current Limiter and Lamp Igniter Circuit

The current limiter and lamp igniter circuit 8 includes a transformer 31 having windings 31a and 31b. The transformer winding 31a has one extremity connected to one a.c. output line 30 of the converter circuit 7, and the other extremity to the output terminal 9 via a capacitor 32. The a.c. output line 30 is also connected to the igniter starter circuit 11 by way of a line 33. The transformer winding 31a forms a saturable inductance and constitutes in combination with the capacitor 32 a current limiting load. The other a.c. output line 30' of the converter circuit 7 is connected to the other output terminal 9 via the primary 40a of another transformer 40 yet to be referred to.

The other winding 31b of the first recited transformer 31 has one extremity connected to the igniter starter circuit 11 by way of a line 34, and another extremity to a silicon symmetric switch (SSS) 35 which is a type of bidirectional thyristor becoming conductive at a predetermined breakover voltage. A parallel circuit of a resistor 36 and a capacitor 37 is connected between the SSS 35 and the line 34, and a series circuit of a diode 38 and a resistor 39 is connected between the SSS 35 and the a.c. output line 30'.

Intended for the detection of a lamp current, the transformer 40 has its primary 40a connected between a.c. output line 30' and output terminal 9'. The secondary 40b of the transformer 40 is connected between the ground and the igniter starter circuit 11. The metallic halide lamp 10 is connected as aforesaid between the pair of output terminals 9 and 9' of the lighting circuit 1.

Igniter Starter Circuit

The igniter starter circuit 11 includes a rectifier diode 41 having its anode connected to the transformer secondary 40b of the current limiter and lamp igniter circuit 8. The cathode of the diode 41 is grounded via an electrolytic capacitor 42 to provide a rectifier circuit.

The cathode of the diode 41 is also connected to the base of an npn transistor 43 via a resistor 44. The emitter of the transistor 43 is grounded, and its collector is connected via a resistor 45 to a supply terminal 46. This supply terminal is also connected to the second fixed contact NO of the relay switch 23b included in the relay circuit 5. The collector of the transistor 43 is connected to the base of another npn transistor 47 via a resistor 48. The emitter of the transistor 47 is also grounded.

The reference numeral 49 generally denotes a relay having two switches 49a and 49b and a coil 49c. The relay coil 49c has one extremity connected to the collector of the transistor 47 and the other extremity to the supply terminal 46. The first relay switch 49a has a movable contact connected to the current limiter and lamp igniter circuit 8 by way of the line 34, a first fixed contact NO connected to the a.c. output line 30 of the converter circuit 7 by way of the line 33, and a second fixed contact NC which is open. The second relay switch 49b has a movable contact connected to an input terminal of the lamp control circuit 12, a fixed contact NO connected to the supply terminal 46, and a second fixed contact NC which is grounded. The movable contacts of both relay switches 49a and 49b are normally engaged with their second fixed contacts NC.

Lamp Control Circuit

As has been stated, the lamp control circuit 12 has its input connected to the movable contact of the second relay switch 49b of the igniter starter circuit 11, and its output to the gate of the FET 27 of the booster circuit 6.

The lamp control circuit 12 is shown in block form as it has been known as a standard component of the lighting circuit for a metallic halide lamp. Functionally, the lamp control circuit 12 is designed to set up one of several lamp control modes depending upon the length of time during which the lamp 10 has been unlit. For example, if the lamp has been unlit for a long time, the lamp control circuit 12 functions to cause the flow of a starting lamp current that is several times greater in magnitude than the current rating of the lamp and, upon lapse of a preassigned time, to cause reduction of the lamp current to the rating. For relighting the lamp shortly after it has been extinguished, a rated current may be fed to the lamp immediately after it has been lit up. The lamp control circuit 12 performs such control functions by varying the duty cycle of the control pulses impressed to the gate of the FET 27 of the booster circuit 6.

Lamp Failure Detector Circuit

The lamp failure detector circuit 13 includes a pnp transistor 50 having its base connected via a resistor 51 to the collector of the transistor 47 of the igniter starter circuit 11. The emitter of the transistor 50 is connected to the supply terminal 46, and its collector grounded via a resistor 53 and capacitor 54. A resistor 52 is connected between the base and emitter of the transistor 50. A resistor 55 is connected in parallel with the capacitor 54.

Also included is an npn transistor 56 having its base connected via a resistor 57 to the interconnection between resistor 53 and capacitor 54. The emitter of this transistor 56 is grounded, and its collector is connected to the interconnection between the voltage dividing resistors 19 and 20 of the switch and breaker circuit 5.

OPERATION

The lamp lighting circuit 1 operates in several different modes depending upon whether or not the lamp 10 glows upon closure of the lamp switch 22 in the absence of trouble and, if it does not, whether the trouble arises from the battery 2 or from the lamp 10. Accordingly, the following operational description will be subdivided into each of these possible cases.

Normal Operation

The transistor 18 of the overvoltage detector circuit 4 and the transistor 56 of the lamp failure detector circuit 13 are both nonconductive in the absence of trouble when the two contact pairs 22a and 22b of the lamp switch 22 is closed. The protection switch or transistor 21 of the switch and breaker circuit 5 is therefore conductive. Thus, as the relay coil 23a becomes energized from the battery 2, the relay switch 23b has its movable contact actuated out of engagement with the first fixed contact NC and into engagement with the second fixed contact NO. The battery voltage is thus impressed to the d.c. voltage booster circuit 6 via the pair of supply lines 14 and 14'. The resulting higher output voltage of the booster circuit 6 is then applied to the d.c. to a.c. converter circuit 7 thereby to be translated into an equivalent a.c. voltage. This a.c. voltage is applied to the metallic halide lamp 10 via the current limiter and lamp igniter circuit 8.

However, a lamp current does not flow immediately upon closure of the lamp switch 22, and this fact is "sensed" by the igniter starter circuit 11 via the transformer 40. The transistor 43 of the circuit 11 remains nonconductive as long as no voltage is impressed to the transformer secondary 40b. Accordingly, the other transistor 47 of the circuit 11 is conductive to permit energization of the relay coil 49c, with the consequent movement of the movable contacts of the relay switches 49a and 49b into engagement with the fixed contacts NO. So actuated, the first relay switch 49a interconnects the lines 33 and 34.

Then the capacitor 37 of the current limiter and lamp igniter circuit 8 will be charged with a time constant that is determined by the capacitance of that capacitor and the resistivity of the resistor 39. The SSS 35 will become conductive when the terminal voltage of the capacitor 37 builds up to its breakover voltage. The instantaneous voltage thus obtained will be superposed on the a.c. output voltage of the converter circuit 7 via the transformer 31, and the resulting starting pulse will be impressed to the lamp 10.

Also, when the movable contact of the second relay switch 49b of the igniter starter circuit 11 is actuated into engagement with the fixed contact NO as aforesaid, the control circuit 12 responds by determining the length of time during which the lamp 10 has been unlit and by correspondingly varying the duty cycle of the control pulses fed to the FET 27 of the booster circuit 6. The resulting d.c. output voltage of the booster circuit 6, thus controlled in magnitude by the control circuit 12, is subsequently translated into an a.c. voltage by the converter circuit 7. The magnitude of the lamp current flowing through the lamp 10 is controlled accordingly.

It will also be seen that the transistor 50 of the lamp failure detector circuit 13 becomes conductive upon conduction of the transistor 47 of the igniter starter circuit 11. The result is the charging of the capacitor 54 with a time constant determined by its own capacitance and the resistance values of the resistors 53 and 57. It is understood that this time constant is much longer than the time required for the full glowing of the lamp 10.

Thus, upon glowing of the lamp 10, both transistors 47 and 50 become nonconductive, so that the charge that has been stored on the capacitor 54 will be released through the resistor 55. The transistor 56 of the lamp failure detector circuit 13 remains nonconductive. This is because, upon lighting of the lamp 10, the resulting lamp current causes the transformer 40 to apply a voltage to the rectifier and smoother circuit means 41 and 42 and hence to cause conduction through the transistor 43. As the transistor 47 thus becomes nonconductive, the transistor 50 becomes nonconductive before the transistor 56 becomes conductive owing to a rise in the potential of the capacitor 54. The relay coil 49 becomes deenergized at the same time, so that the delivery of the starting pulse terminates as the movable contacts of the relay switches 49a and 49b both reengage the fixed contacts NC.

Once ignited as above stated, the lamp 10 will continue glowing with the rated current under the control of the lamp control circuit 12.

Lamp Failure

If the lamp 10 remains unlit for its own trouble upon closure of the lamp switch 22, the transistors 47 and 50 will remain conductive, permitting the capacitor 54 of the lamp failure detector circuit 13 to be charged from the supply terminal 46. Then the transistor 56 of the circuit 13 will become conductive in response to a rise in the potential of the capacitor 54.

The conduction of the transistor 56 causes a decrease in the base potential of the transistor 21 of the switch and breaker circuit 5. The resulting nonconduction of the transistor 21, that is, the opening of the protection switch, causes deenergization of the relay coil 23a. Thus, as the movable contact of the relay switch 23b reengages the fixed contact NC, the application of the battery voltage to the booster circuit 6 is discontinued. The LED 25 will then glow to warn the vehicle driver of the lighting trouble. vehicle of the lighting trouble.

Battery Trouble

The lighting circuit 1 can handle certain rises in battery voltage, lighting up the lamp 10 despite such overvoltage. However, when the battery voltage rises to, say, 18 volts or more, the Zener diode 17 of the overvoltage detector circuit 4 will become conductive to turn the transistor 18 on. The result is the nonconduction of the transistor 21 of the switch and breaker circuit 5. Therefore, even though the lamp switch 22 is closed, the relay coil 23a will remain unenergized thereby holding the movable contact of the relay switch 23b in engagement with the fixed contact NC. The battery voltage is not impressed to the booster circuit 6, and the trouble will be visually indicated by the LED 25.

Possibly, the user may connect the battery 2 in the wrong polarity between the pair of input terminals 3 and 3'. The transistor 21 will then remain nonconductive upon closure of the lamp switch 22 thereby preventing the energization of the relay coil 23a. The movable contact of the relay switch 23b will remain engaged with the fixed contact NC, and the LED 25' will glow to indicate the wrong connection of the battery 2.

As may have been understood from the foregoing description of operation, the transistor 56 of the lamp failure detector circuit 13 becomes conductive when the lamp 10 remains unlit for its own failure for a preassigned length of time following the closure of the lamp switch 22. The transistor 56 on conduction causes nonconduction through the transistor 21 of the switch and breaker circuit 5, resulting in the termination of the application of a high starting voltage to the faulty lamp 10.

Possibly, the lamp 10 may temporarily go off when the lamp switch 22 is held closed. The battery voltage will then be not cut off because the charge on the capacitor 54 will be approximately zero. The igniter starter circuit 11 will immediately restart the lamp 10.

In the event of a battery overvoltage, on the other hand, the transistor 18 of the overvoltage detector circuit 4 becomes conductive, again causing nonconduction through the transistor 21 of the switch and breaker circuit 5. The destruction of the circuit elements, and of the lamp 10 through an increase in lamp current, is thus prevented.

Additionally, when the battery 2 is connected in the wrong polarity between the pair of input terminals 3 and 3', the transistor 21 of the switch and breaker circuit 5 remains nonconductive. As the relay switch 23b keeps the lighting circuit open, the active elements of the circuit (notably, the FET 27 of the booster circuit 6) is protected from short circuiting.

ALTERNATE EMBODIMENT

General

Figure 3:
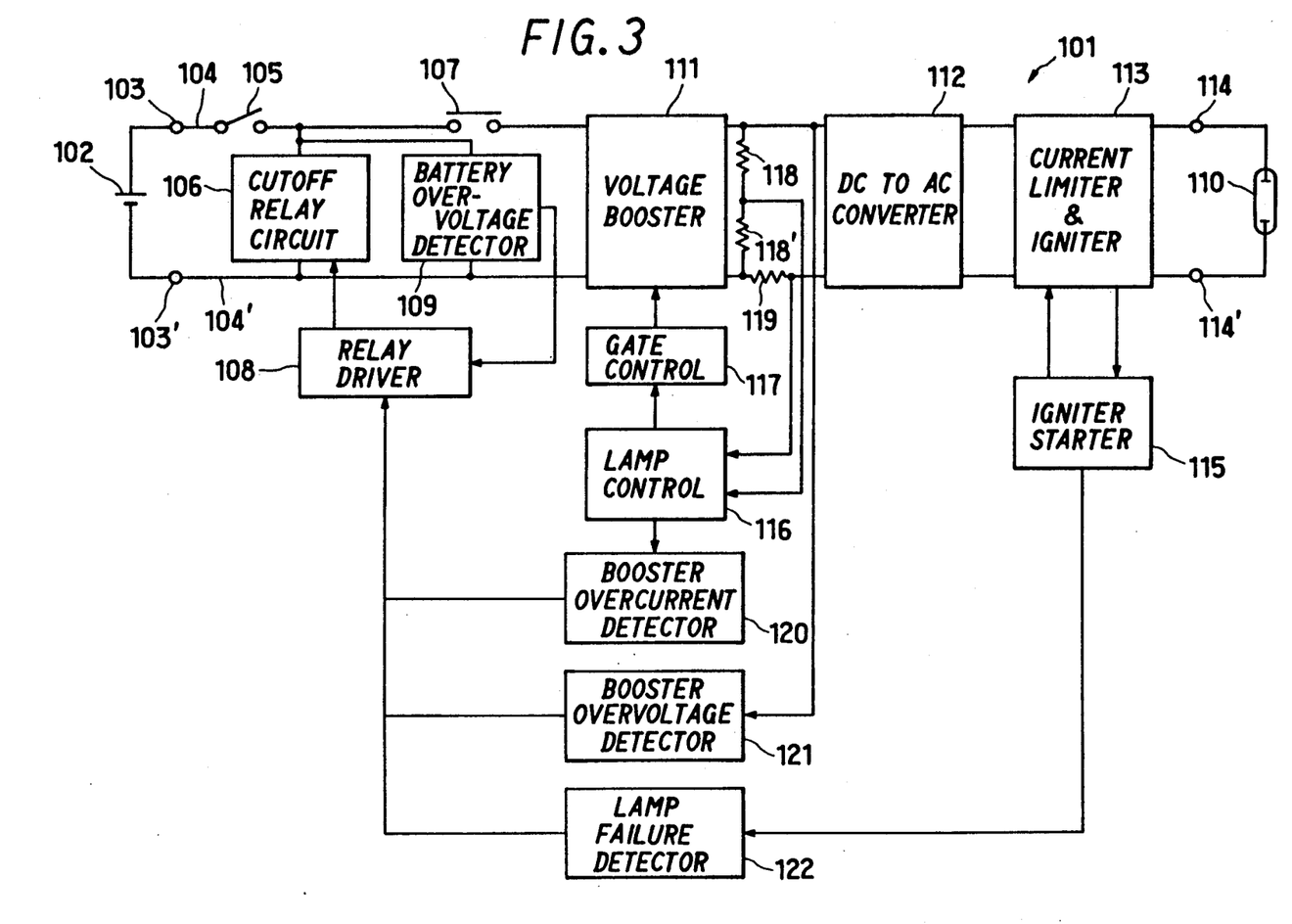
FIG. 3 is a block diagram of another preferred form of lamp lighting circuit according to the invention.
Figure 4:
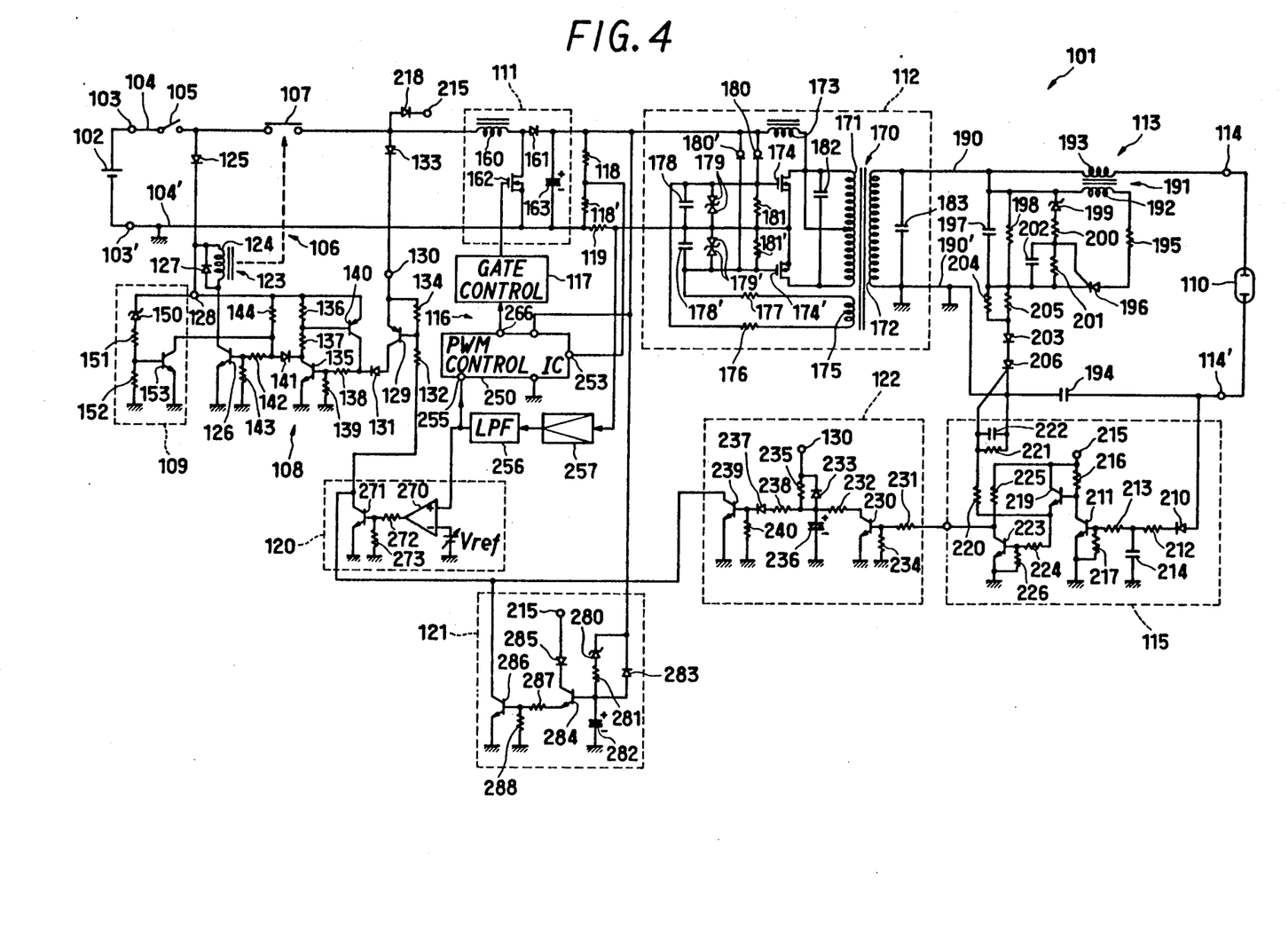
FIG. 4 is a schematic electrical diagram showing the lamp lighting circuit of FIG. 3 in more detail.
Figure 5:
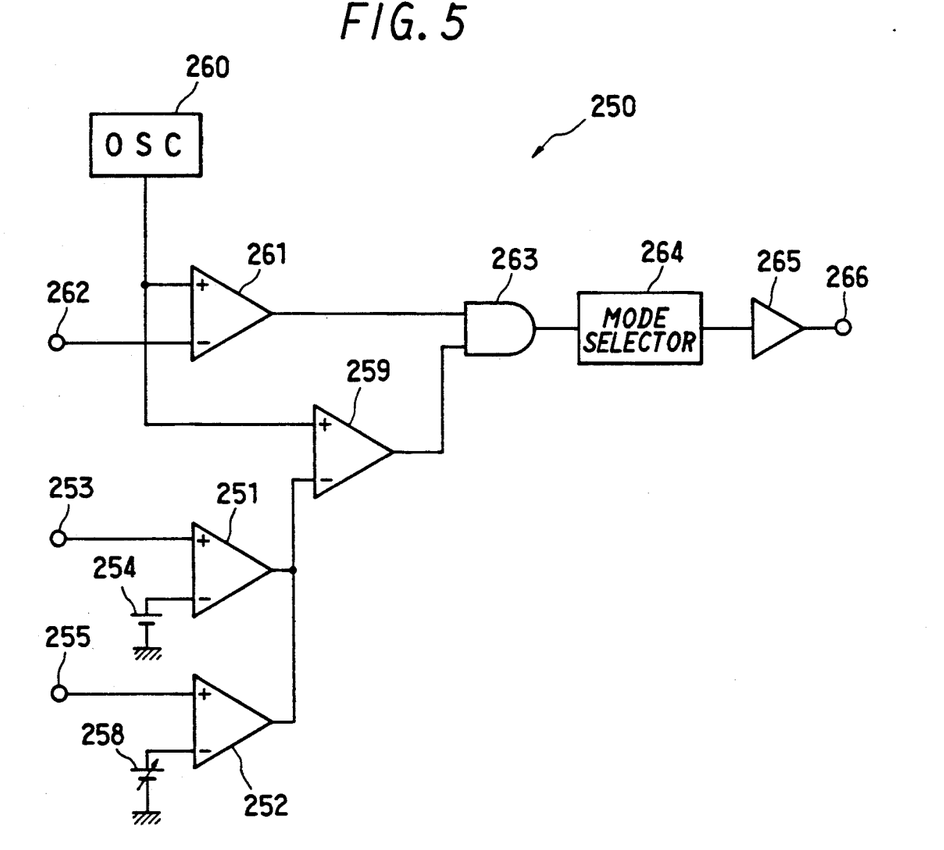
FIG. 5 is a block diagram showing in more detail part of the lamp control circuit included in the lamp lighting circuit of FIG. 3.

FIGS. 3-5 illustrate another preferred embodiment of the invention. With reference to FIG. 3, which shows the general organization of the alternate lighting circuit 101, a battery 102 is connected between a pair of input terminals 103 and 103' for feeding a metallic halide lamp 110. The input terminals 103 and 103' are connected to a positive 104 and a negative 104' d.c. supply line. A lamp switch 105 is provided on the positive supply line 104.

A cutoff relay circuit 106, including a relay switch 107 on the positive supply line 104, functions as a circuit breaker for automatically opening the lighting circuit 101 in the event of various abnormal circuit conditions set forth hereafter. A relay driver circuit 108 activates the cutoff relay circuit 106 for causing the same to open the lighting circuit in response to outputs from a battery overvoltage detector circuit 109 and various other trouble detector circuits yet to be described.

A d.c. voltage booster circuit 111, a d.c. to a.c. converter circuit 112 and a current limiter and lamp igniter circuit 113 are connected successively on the subsequent stage of the cutoff relay circuit 106. The lamp 110 is replaceably connected between the pair of a.c. output terminals 114 and 114' of the current limiter and lamp igniter circuit 113. This circuit 113 is also connected in circuit with an igniter starter circuit 115. The noted circuits 111, 112, 113 and 115 perform substantially the same functions as those of the corresponding circuits 6, 7, 8 and 11 of the preceding embodiment.

Preferably, in the practice of the invention, the current limiter and lamp igniter circuit 113 and igniter starter circuit 14 may be provided on one baseplate, and all the other circuits on another baseplate. The two groups of circuits may be interconnected via cables with connectors.

A lamp control circuit 116 is connected to the booster circuit 111 via a gate control circuit 117 for controllably varying the booster output voltage. Toward this end the lamp control circuit 116 delivers pulses to the gate control circuit 117. The duty cycle of the pulses are determined by the output voltage of the booster circuit 111, obtained via voltage dividing resistors 118 and 118' connected between the pair of output lines of the booster circuit, and by the output current of the booster circuit. A resistor 119 is provided on the grounded output line of the booster circuit 111 in order to convert its output current into a voltage needed by the lamp control circuit 116. The lamp control circuit 116 and the battery 102 have a common ground.

A booster overcurrent detector circuit 120, a booster over-voltage detector circuit 121 and a lamp failure detector circuit 122 are all connected to the relay driver circuit 108 for causing the same to activate the circuit breaker in the event of the associated abnormal circuit conditions.

The booster overcurrent detector circuit 120 is intended to detect an excessive rise in the output current of the booster circuit 111. Such an excessive rise in the booster output current may occur as upon accidental disengagement and shorting of the cable connectors between converter circuit 112 and current limiter and lamp igniter circuit 113.

The booster overvoltage detector circuit 121 signals the relay driver circuit 108 when the booster circuit 111 continues the production of a predetermined maximum output voltage for a preassigned length of time. The booster circuit 111 produces the highest output voltage as the duty cycle of the pulses generated by the lamp control circuit 116 maximizes as in the event of the shorting of the lamp 110 or of the a.c. output terminals 114 and 114', or the breakage or disengagement of the cables between converter circuit 112 and current limiter and lamp igniter circuit 113. Should this maximum voltage be produced too long, the result might be the destruction of some circuit elements or the overheating or deterioration of the transformers.

As in the preceding embodiment, the lamp failure detector circuit 122 relies on the igniter starter circuit 115 for detecting whether or not the lamp 10 starts glowing within a prescribed time after the closure of the lamp switch. If it does not, the lamp failure detector circuit 122 signals the relay driver circuit 108 in order to avoid troubles that might arise from the lamp failure.

The following is a more detailed discussion of the listed components of the alternate lighting circuit 101. Unless otherwise specified, reference may be had to FIG. 4 throughout such detailed discussion.

Cutoff Relay Circuit

The cutoff relay circuit 106 includes a relay 123 having a coil 124 and the noted normally open switch 107 on the positive supply line 104. The relay coil 124 has one extremity connected to the cathode of a diode 125 and another extremity to the collector of an npn transistor 126. The diode 125, with its anode connected to the positive supply line 104, functions to cause the relay 123 to open the circuit when the battery 102 is accidentally connected between the pair of input terminals 103 and 103' in the wrong polarity.

The transistor 126, with its emitter grounded, constitutes a part of the relay driver circuit 108. As long as the transistor 126 is conductive while the lamp switch 105 is held closed, the relay coil 23 can be energized to close the relay switch 107, permitting the application of the battery voltage to the booster circuit 111. The relay coil 23 will become deenergized when the transistor 126 becomes nonconductive. The relay switch 107 will then open.

Therefore, in this alternate embodiment, the transistor 126 forms the protection switch equivalent in function to the transistor 21 of the first described embodiment. This protection switch is to be opened by signals from the battery overvoltage detector circuit 106, booster overcurrent detector circuit 120, booster overvoltage detector circuit 121 and lamp failure detector circuit 122.

The relay coil 124 is connected in parallel with a diode 127. The cathode of this diode 127 is connected to a supply terminal 128.

Relay Driver Circuit

The relay driver circuit 108 includes a pnp transistor 129 having an emitter connected to a supply terminal 130, a collector connected to the anode of a diode 131, and a base connected via a resistor 132 to the collectors of npn transistors forming the final stages of the booster overcurrent detector circuit 120, booster overvoltage detector circuit 121 and lamp failure detector circuit 122. The supply terminal 130 is connected via a diode 133 to the positive supply line 104, in a position subsequent to the relay switch 107. A resistor 134 is connected between the base and emitter of the transistor 129.

An npn transistor 135 has an emitter grounded, a collector connected to the supply terminal 128 via a serial connection of resistors 136 and 137, and a base connected to the cathode of the diode 131 via a resistor 138. Another resistor 139 is connected between the base and emitter of the transistor 135.

Another pnp transistor 140 has an emitter connected to the supply terminal 128, a collector connected to the cathode of the diode 131, and a base connected to the interconnection between the resistors 136 and 137.

A diode 141 has a cathode connected to the collector of the transistor 135, and an anode connected to the base of the transistor 126, the protection switch, via a resistor 142. A resistor 143 is connected between the base and emitter of the transistor 126. A resistor 144 is connected between the anode of the diode 141 and the supply terminal 128.

Thus, in the relay driver circuit 108, the conduction of the transistor 129 results in the conduction of the transistors 135 and 140 and in the nonconduction of the transistor 126. The signal holding action of the transistor 140 serves to prevent chattering in trouble detection and is of significance in cases where the lamp 110 remains unlit beyond a preassigned time or where the booster circuit 111 continues production of excessive output current, or of the maximum output voltage, beyond a preassigned time. Such signal holding action realizes a saving of power as only a minimum number of circuits including the relay driver circuit 107 needs to be fed from the positive supply line 104 via the diode 125 during abnormal circuit conditions.

Battery Overvoltage Detector Circuit

As shown enclosed in the dashed outline, the battery overvoltage detector circuit 109 includes a Zener diode 150 having its cathode connected to the supply terminal 128 and its anode grounded via a serial connection of resistors 151 and 152. Also included is an npn transistor 153 having an emitter grounded, a collector connected to the interconnection between the resistors 142 and 144 of the relay driver circuit 108, and a base connected to the interconnection between the resistors 151 and 152.

The Zener diode 150 conducts when the battery voltage exceeds a predetermined limit, resulting in the conduction of the transistor 153. The conduction of the transistor 153 results in turn in the nonconduction of the transistor 126 of the relay driver circuit 108 and, therefore, in the deenergization of the relay coil 124.

D.C. Voltage Booster Circuit

The booster circuit 111 is shown as a chopper type d.c. to d.c. converter of the same construction as the booster circuit 6 of the first disclosed lighting circuit 1. Thus the booster circuit 111 comprises an inductor 160 and a rectifier diode 161 on the positive supply line 104, an n channel FET 162 connected between the pair of supply lines 104 and 104', and a smoothing capacitor 163 also connected between the pair of supply lines 104 and 104'. The FET 162 has its gate connected to the lamp control circuit 116 via the gate control circuit 117. The operation of this booster circuit 111 has also been set forth in connection with its counterpart of the preceding embodiment.

D.C. to A.C. Converter Circuit

Shown as a self excited push pull inverter, the converter circuit 112 includes a transformer 170 comprising a primary winding 171 and a secondary winding 172. The transformer primary 171 is center tapped for connection to one extremity of a choke coil 173, the other extremity of which is connected to the positive output line of the booster circuit 111.

The opposite extremities of the transformer primary 171 are connected to the drains of a pair of FETs 174 and 174'. The sources of these FETs are both connected to the negative supply line 104' via the resistor 119. The gate of the FET 174 is connected to one extremity of a feedback winding 175 via a resistor 176, and the gate of the other FET 174' is connected to the other extremity of the feedback winding 175 via another resistor 177.

A capacitor 178 and a pair of opposed Zener diodes 179 are connected between the gate and source of the FET 174. Similarly, a capacitor 178' and a pair of opposed Zener diodes 179' are connected between the gate and source of the other FET 174'. The Zener diodes 179 and 179' are provided by way of protection against voltage surges.

A pair of constant current diodes 180 and 180' are provided to minimize power loss by timing the switching operation of the FETs 174 and 174'. The diode 180 is connected between the gate of the FET 174 and the positive output line of the booster circuit 111. The other diode 180' is connected between the gate of the other FET 174' and the positive output line of the booster circuit 111.

A resistor 181 is connected between the gate and source of the FET 174, and another resistor 181' between the gate and source of the other FET 174'. A capacitor 182 is connected between the opposite extremities of the transformer primary 171, and another capacitor 183 between the opposite extremities of the transformer secondary 172.

The d.c. to a.c. converter circuit 112 of the foregoing construction provides a sinusoidal output voltage between the opposite extremities of the transformer secondary 172 as the pair of FETs 174 and 174' are oppositely turned on and off by the feedback winding 175 connected to the transformer primary 171.

The resonance frequency of the converter circuit 112, which depends upon the inductance of the transformer primary 171 and the capacitance of the capacitor 182 or 183, may be set at 20 kilohertz. Higher resonance frequencies are advantageous purely from the standpoint of the reduction of the size of the transformer 170, as well as of a trigger transformer included in the current limiter and lamp igniter circuit 113. However, should the resonance frequency be too high, acoustic resonance might take place, running counter to the stable lighting of the lamp 110. The noted 20 kilohertz resonance frequency is higher than the conventional value of 10 kilohertz for a 35 watt lamp but within the range (less than 30 kilohertz) in which acoustic resonance does not occur.

Current Limiter and Lamp Igniter Circuit

The above described converter circuit 112 has a pair of a.c. output lines 190 and 190'. These lines connect the opposite extremities of the transformer secondary 172 to the pair of a.c. output terminal 114 and 114', respectively.

The current limiter and lamp igniter circuit 113 includes a trigger transformer 191 having a primary winding 192 and a secondary winding 193. The transformer secondary 193 is provided on the a.c. line 190. A capacitor 194 is provided on the other a.c. line 190'. The transformer secondary 193 and the capacitor 194 serve the purpose of current limiting load. The capacitor 194 performs the additional function of lamp current detection. The additional use of the capacitor 194 for lamp current detection makes the circuit 113 simpler and less expensive than if a current transformer were used for that purpose.

The transformer primary 192 has one extremity connected to the a.c. output line 190 of the converter circuit 112. The other extremity of the transformer primary 192 is connected via a resistor 195 to the anode of a thyristor 196. The use of the thyristor as a switching element is preferred because of its greater capability of withstanding current surges than an SSS. The cathode of the thyristor 196 is connected to a capacitor 197 and thence to the a.c. line 190. A resistor 198 is connected in parallel with the capacitor 197.

Also connected to the a.c. output line 190 of the converter circuit 112 is the cathode of a Zener diode 199, the anode of which is connected to the cathode of the thyristor 196 via a serial connection of resistors 200 and 201. The gate of the thyristor 196 is connected to the interconnection between the resistors 200 and 201. A capacitor 202 is connected in parallel with the resistor 201.

The cathode of the thyristor 196 is also connected to the anode of a diode 203 via a parallel connection of resistors 204 and 205. The cathode of the diode 203 is connected to the anode of another thyristor 206. The cathode of this thyristor 206 is connected to the a.c. line 190'. Also the thyristor 206 has its gate and cathode connected to the igniter starter circuit 115 thereby to be switched on and off.

Thus, when the lamp 110 is to be lit up or to be relighted after having momentarily gone off, the thyristor 206 becomes conductive in response to a signal from the igniter starter circuit 115. The thyristor 206 on conduction permits the capacitor 197 to be charged during the half wave periods of the a.c. output from the converter circuit 112. The voltage across the capacitor 197 is detected by the serial circuit of Zener diode 199 and resistors 200 and 201. The Zener diode 199 conducts in response to a predetermined rise in the voltage across the capacitor 197, thereby causing conduction through the thyristor 196. The capacitor 197 discharges upon conduction of the thyristor 196.

The trigger transformer 191 functions to step up the voltage generated upon discharge of the capacitor 197 for superposition on the sinusoidal output from the converter circuit 112. The resulting high voltage starting pulse is impressed to the lamp 110 for igniting the same.

Igniter Starter Circuit

The igniter starter circuit 115 includes a rectifier diode 210 having its anode connected to the a.c. output terminal 114'. The cathode of the rectifier diode 210 is connected to the base of an npn transistor 211 via a serial connection of resistors 212 and 213. A capacitor 214 is connected between the interconnection between the resistors 212 and 213 and the ground. The resistor 212 and capacitor 214 constitute in combination an integrating circuit.

The npn transistor 211 has its emitter grounded and its collector connected to a supply terminal 215 via a resistor 216. A resistor 217 is connected between the base and emitter of the transistor 211. It is understood that the supply terminal 215 is connected as shown to the positive supply line 104 via a diode 218, at a point between relay switch 107 and booster circuit 111. A voltage is therefore impressed to the supply terminal 215 upon closure of both lamp switch 105 and relay switch 107.

Another npn transistor 219, which is an emitter follower, has its base connected to the collector of the transistor 211, and its emitter connected to the gate of the thyristor 206 of the igniter circuit 113 via a resistor 220. A parallel circuit of resistor 221 and capacitor 222 is connected between the gate and cathode of the thyristor 206.

A still another npn transistor 223 has its emitter grounded, its base connected to the emitter of the transistor 219 via a resistor 224, and its collector connected to the supply terminal 215 via a resistor 225 and to the input of the lamp failure detector circuit 122. A resistor 226 is connected between the base and emitter of the transistor 223.

In the igniter starter circuit 115 of the foregoing construction, the transistor 211 is nonconductive immediately after the closure of the lamp switch because no voltage has developed across the capacitor 194 of the lamp igniter circuit 113. Since the transistor 219 is conductive during the nonconduction of the transistor 211, the thyristor 206 of the lamp igniter circuit 113 becomes conductive, causing the production of a starting pulse, as has been stated in connection with the lamp igniter circuit.

The transistor 223 also conducts upon conduction of the transistor 219. The output from the collector of this transistor 223 is fed to the lamp failure detector circuit 122 by way of a signal indicative of the fact that the lamp 110 is not lit up yet.

Then, upon subsequent glowing of the lamp 110, a voltage that has developed across the capacitor 194 causes conduction through the transistor 211 and nonconduction through the transistors 219 and 223. The production of the starting pulse discontinues as the thyristor 206 becomes nonconductive. The lamp failure detector circuit 122 is signaled that the lamp 110 has lit up.

Lamp Failure Detector Circuit

The lamp failure detector circuit 122 includes an npn transistor 230 having an emitter grounded, and a base connected via a resistor 231 to the collector of the transistor 223 of the igniter starter circuit 115. The collector of the transistor 230 is connected via a resistor 232 to the anode of a diode 233, the cathode of which is connected to the supply terminal 130. A resistor 234 is connected between the base and emitter of the transistor 230. Another resistor 235 is connected in parallel with the diode 233.

A timing capacitor 236 is connected between the anode of the diode 233 and the ground. A second diode 237 has its anode connected to the anode of the first recited diode 233 via a resistor 238. The cathode of the second diode 237 is connected to the base of a second npn transistor 239. The emitter of the second transistor 239 is grounded, and its collector to the base resistor 132 of the transistor 129 of the relay driver circuit 108. A resistor 240 is connected between the base and emitter of the second transistor 239.

As will have been understood from the above description of the igniter starter circuit 115, its transistor 223 remains conductive in the event of a lamp failure. Since the first transistor 230 of the lamp failure detector circuit 122 is nonconductive during the conduction of the transistor 223, the capacitor 236 is charged from the supply terminal 130 until, upon lapse of a preassigned time, the second transistor 239 becomes conductive thereby causing conduction through the transistor 129 of the relay driver circuit 108.

Lamp Control Circuit

As has been mentioned, the lamp control circuit 116 produces control pulses with a duty cycle determined by the ouput voltage and current of the booster circuit 111, for delivery to the gate of the FET 165 of the booster circuit via the gate control circuit 117. Toward this end the lamp control circuit 116 comprises a pulse width modulation (PWM) control circuit 250 which preferably takes the form of an integrated circuit (IC).

FIG. 5 is a more detailed illustration, though in block diagrammatic form, of the PWM control IC 250. It includes a first 251 and a second 252 differential amplifier. As will be seen from both FIGS. 4 and 5, the first differential amplifier 251 has its noninverting input 253 connected to the interconnection between the pair of voltage dividing resistors 118 and 118' on the output stage of the booster circuit 111. The inverting input of the first differential amplifier 251 is connected to a reference voltage source 254.

The second differential amplifier 252 has its noninverting input 255 connected via a low pass filter (LPF) 256 and amplifier 257 to the current detecting resistor 119 on the output stage of the booster circuit 111. The inverting input of the second differential amplifier 252 is connected to a reference voltage source 258.

The outputs of the two differential amplifiers 251 and 252 are both connected to the minus input of a PWM comparator 259. The plus input of this PWM comparator 259 is connected to an oscillator 260 for inputting a sawtooth wave therefrom.

Another comparator 261 has a minus input connected to a control terminal 262, and a plus input to the oscillator 260. It is understood that a predetermined voltage is impressed to the control terminal 262 in order to determine the upper limit of the duty cycle of the control pulses to be fed to the FET 162 of the booster circuit 111.

Both comparators 259 and 261 have their outputs connected to an AND gate 263. The output of this AND gate is connected via an output mode selector circuit 264 and buffer 265 to an output terminal 266. The output terminal 266 is connected to the gate control circuit 117 and thence to the gate of the FET 162 of the booster circuit 111.

Booster Overcurrent Detector Circuit

The booster overcurrent detector circuit 120 includes a comparator 270 for comparing the output voltage of the LPF 256 with a reference voltage Vref. The output of the comparator 270 is connected to the base of an npn transistor 271 via a resistor 272. The transistor 271 has its emitter grounded and its collector connected to the base resistor 132 of the transistor 129 of the relay driver circuit 108. A resistor 273 is connected between the base and emitter of the transistor 271.

The transistor 271 becomes conductive when the output current of the booster circuit 9 is of abnormally great magnitude, that is, when the output voltage of the LPF 256 is higher than the reference voltage Vref. The conduction of the transistor 271 results in the conduction of the transistor 129 of the relay driver circuit 108.

Booster Overvoltage Detector Circuit

The booster overvoltage detector circuit 121 includes a Zener diode 280 having its cathode connected to the positive output line of the booster circuit 111, and its anode grounded via a serial connection of resistor 281 and timing capacitor 282. A diode 283 has its cathode connected to the cathode of the Zener diode 280, and its anode to the interconnection between resistor 281 and capacitor 282.

The interconnection between resistor 281 and capacitor 282 is also connected to the base of an npn emitter follower transistor 284. This transistor has its collector connected to the cathode of a diode 285, and its emitter to the base of another npn transistor 286 via a resistor 287. The diode 285 has its anode connected to the supply terminal 215. The transistor 286 has its emitter grounded, and its collector connected to the base resistor 132 of the transistor 129 of the relay driver circuit 108. A resistor 288 is connected between the base and emitter of the transistor 286.

If the booster circuit 111 continues production of the maximum output voltage, the capacitor 282 is charged through the Zener diode 280. Then, upon lapse of a preassigned time, the transistors 284 and 286 become successively conductive. The conduction of the transistor 286 results in the conduction of the transistor 129 of the relay driver circuit 108.

OPERATION OF ALTERNATE EMBODIMENT

The operation of the alternate lamp lighting circuit 101 will also be subdivided into the case where it operates normally and other cases where troubles occur. The troubles to which the circuit breaker of this embodiment responds for circuit protection are lamp failure, booster overcurrent, booster overvoltage, and battery overvoltage.

Normal Operation

When the lamp switch 105 is closed, the transistor 126 (protection switch) of the relay driver circuit 108 is conductive in the absence of any abnormal circuit conditions, permitting the relay coil 124 to be energized for closing the relay switch 107 on the positive d.c. supply line 104. The battery voltage will therefore be impressed to the d.c. voltage booster circuit 111.

The metallic halide lamp 110 does not glow immediately upon closure of the lamp switch 105. Also, since the output current of the booster circuit 111 is very small for some time after the closure of the lamp switch, the duty cycle of the control pulses fed from the PWM control IC 250 to the gate of the FET 162 via the gate control circuit 117 is determined solely by the booster output voltage as detected by the voltage dividing resistors 118 and 118'. The result is an increase in the output voltage of the booster circuit 111. This output voltage is subsequently translated into a sinusoidal a.c. voltage by the converter circuit 112 for application to the lamp 110.

Also, before voltage develops across the capacitor 194 of the lamp igniter circuit 113, the igniter starter circuit 115 will operate to cause conduction through the thyristor 206 of the lamp igniter circuit. The capacitor 197 will therefore be charged. Then, as the thyristor 196 becomes conductive subsequently, the resulting high voltage pulse will be superposed on the a.c. output from the converter circuit 112 for triggering the metallic halide lamp 110.

The transistor 223 of the igniter starter circuit 115 has been conductive before the lamp 110 starts glowing. The transistor 230 of the lamp failure detector circuit 122 has therefore been nonconductive, allowing the capacitor 236 to be charged from the supply terminal 130. However, if the lamp 110 starts glowing before conduction of the transistor 239, the transistor 223 becomes nonconductive as the igniter starter circuit 115 detects the fact in cooperation with the capacitor 194 of the lamp igniter circuit 113. The capacitor 236 discharges as the transistor 230 becomes conductive upon nonconduction of the transistor 223. Thus the lamp failure detector circuit 122 does not signal the relay driver circuit 108 when the lamp 110 is lit up within a predetermined time following the closure of the lamp switch 105.

The transistor 271 of the booster overcurrent detector circuit 120, and the Zener diode 280 and transistors 284 and 286 of the booster overvoltage detector circuit 121, all remain nonconductive as long as the lighting circuit 101 is operating normally. These detector circuits 120 and 121 do not signal the relay driver circuit 108, either.

Consequently, the transistor 129 of the relay driver circuit 108 remains nonconductive in the absence of signals from the booster overcurrent detector circuit 120, booster overvoltage detector circuit 121 and lamp failure detector circuit 122. The transistor 126 of the relay driver circuit 108 remains conductive, permitting the relay coil 124 to be energized for holding the relay switch 107 closed.

The PWM control IC 250 generates control pulses with a duty cycle determined by the output voltage and current of the booster circuit 111. These control pulses are impressed via the gate control circuit 117 to the gate of the FET 45 of the booster circuit 111 for controlling its output voltage.

The intensity of light emitted by the lamp 110 increases for a certain length of time after it has started glowing. The output current of the booster circuit 111 increases with the lamp voltage. The PWM control IC 250 functions to decrease the duty cycle of the control pulses in response to such an increase in the output current of the booster circuit 111. The output voltage of the booster circuit 111 decreases accordingly, until the luminous intensity of the lamp 110 levels off at a rated value, with the output current of the booster circuit held constant.

Lamp Failure

The lamp 110 may remain unlit for its own failure upon closure of the lamp switch 105, or the lamp switch may be closed with no lamp connected between the pair of a.c. output terminals 114 and 114'. Operating in coaction with the capacitor 63 of the lamp igniter circuit 113, the igniter starter circuit 115 causes conduction through the thyristor 74 upon detection of no lighting of the lamp, with the consequent production of a starting pulse.

As has been mentioned in the course of the foregoing description of normal operation, the transistor 223 of the igniter starter circuit 115 is conductive as long as the lamp 110 remains unlit. The transistor 230 of the lamp failure detector circuit 122 is therefore nonconductive, allowing the capacitor 236 to be charged from the supply terminal 130. Then, upon lapse of the preassigned time, the transistor 100 becomes conductive.

The conduction of the transistor 100 causes conduction through the transistor 129 of the relay driver circuit 108 and, in consequence, nonconduction through the transistor 126. As the relay coil 124 becomes deenergized by the opening of the protection switch, the relay switch 107 opens to disconnect the battery 102 from the booster circuit 111. The lighting circuit 101 will remain broken pending reclosure of the lamp switch 105 after the replacement of the faulty lamp 110 or, if the lamp has been missing, the connection of a lamp between the pair of a.c. output terminals 114 and 114'.

Booster Overcurrent

Excessive current will flow from battery 102 to converter circuit 112 through the booster circuit 111 in the event of a shorting on the output stage of the booster circuit. The overcurrent will be translated into an equivalent voltage by the resistor 119 on the negative output line of the booster circuit 111. This voltage representative of the booster overcurrent is directed to the comparator 270 of the booster overcurrent detector circuit 120 via the amplifier 257 and LPF 256. Whenever the comparator input voltage exceeds the reference voltage Vref, the comparator 270 causes conduction through the transistor 271.

The conduction of the transistor 271 again causes conduction through the transistor 129 of the relay driver circuit 108 and, therefore, nonconduction through the transistor 126. Thus the relay 123 opens its switch 107 to cuff off the battery 102. The lighting circuit 101 will remain broken pending reclosure of the lamp switch 105.

Booster Overvoltage

The lamp control circuit 116 maximizes the duty cycle of the control pulses fed to the booster circuit 111 via the gate control circuit 117 in cases where the lamp 110 has short circuited or where the lighting circuit 101 has become open on the output side of the booster circuit. Thereupon the booster circuit 111 will start producing the highest output voltage, with the result that the Zener diode 280 of the booster overvoltage detector circuit 121 will become conductive.

The timing capacitor 282 of the booster overvoltage detector circuit 121 will then be charged, causing conduction through the transistor 284, and therefore through the transistor 286, upon lapse of a prescribed time. Thus the transistor 129 of the relay driver circuit 108 will again become conductive, with the consequent nonconduction of the transistor 126. As the relay 123 opens the switch 107, the lighting circuit 101 will remain broken pending reclosure of the lamp switch 105.

Battery Overvoltage

Conduction will take place through the Zener diode 150 of the battery overvoltage detector circuit 109 in event the battery 102 develops overvoltage. Thus switched on, the transistor 153 causes nonconduction through the transistor 126 of the relay driver circuit 108, resulting in the deenergization of the relay coil 124 and hence in the opening of the relay switch 107.

However, unlike the above explained cases of lamp failure, booster overvoltage and booster overcurrent, the relay switch 107 is not locked in the open state. The transistor 153 will again become nonconductive when the battery voltage drops to a normal value, permitting reenergization of the relay coil 124. The relay switch 107 will then be automatically reclosed to permit the lighting circuit 101 to relight the lamp 110.

Such automatic reclosure of the relay switch is preferred in the case of battery overvoltage. The battery overvoltage detector circuit 109 responds even to an instantaneous overvoltage resulting as when voltage surges are superposed on the battery voltage. Should the lighting circuit be opened and held open each time such surges occur, the motor vehicle fitted with the lighting circuit would have to travel through the darkness until the driver reactivates the lamp switch. This danger is precluded as the battery overvoltage detector circuit 109 is designed to automatically reclose the circuit immediately when the supply voltage drops to a normal value.

If the battery 102 is connected between the pair of d.c. input terminals 103 and 103' in the wrong polarity, the diode 125 blocks the current from the relay 123 when the lamp switch 105 is closed. The relay switch 107 will therefore be left open.

Although the lamp lighting circuit of this invention has been shown and described hereinbefore in very specific aspects thereof and as adapted for metallic halide lamps for use on motor vehicles, it is understood that the invention itself is not to be limited by the exact details of this disclosure. The invention is adaptable for other applications, and a variety of modifications or alterations of the illustrated embodiments may be made in order to conform to design preferences or to each specific application of the invention. For example, digital timers or counters may be adopted for measuring the time during which the lamp remains unlit.

What we claim is:

1. A lamp lighting circuit for connection between a power supply and an electric lamp, comprising:
   (a) a pair of input terminals between which the power supply is to be connected;
   (b) a pair of output terminals between which the lamp is to be connected;
   (c) an operator actuated lamp switch having a first side connected to a predetermined point between the input and output terminals;
   (d) a protection switch connected in series with the lamp switch between a second side of said lamp switch and one of said input terminals;
   (e) a circuit breaker connected between the input and output terminals and also connected to the protection switch for permitting the power supply to power the lamp when both the lamp switch and the protection switch are closed; and
   (f) detector means connected to the protection switch for opening the same in response to a prescribed abnormal circuit condition, the circuit breaker responding to the opening of the protection switch by electrically disconnecting the power supply from the lamp.

2. The lamp lighting circuit of claim 1 wherein the detector means comprises lamp failure detector means for opening the protection switch when the lamp remains unlit for a prescribed time following the closure of the lamp switch.

3. The lamp lighting circuit of claim 2 wherein the lamp failure detector means comprises:
   (a) lamp current detector means for detecting a lamp current flowing through the lamp when the same is lit up following the closure of the lamp switch, the lamp current detector means providing an output signal indicative of the unlit state of the lamp;
   (b) measuring means responsive to the output signal of the lamp current detector means for measuring the time during which the lamp remains unlit following the closure of the lamp switch; and
   (c) actuating means for opening the protection switch when the lamps remains unlit for the prescribed time.

4. The lamp lighting circuit of claim 1 wherein the detector means comprises an overvoltage detector circuit for opening the protection switch when the output voltage of the power supply exceeds a predetermined value.

5. The lamp lighting circuit of claim 1 wherein the detector means holds the protection switch open when lamp switch is closed with the power supply connected in the wrong polarity between the pair of input terminals.

6. The lamp lighting circuit of claim 1 further comprising means for producing a warning when the circuit breaker is actuated to open the lighting circuit.

7. A lamp lighting circuit for connection between a power supply and an electric lamp, comprising:
   (a) a pair of input terminals between which the power supply is to be connected;
   (b) a pair of output terminals between which the lamp is to be connected;
   (c) an operator actuated lamp switch connected between the input and output terminals;
   (d) a protection switch connected in series with the lamp switch;
   (e) a relay coil connected in series with the lamp switch and the protection switch whereby the relay coil is energized only when both lamp switch and protection switch are closed;
   (f) a relay switch connected between the input and output terminals and actuated by the relay coil for closing the lighting circuit when the relay coil is energized;
   (g) overvoltage detector means connected to the protection switch for opening the same when the output voltage of the power supply exceeds a predetermined value; and
   (h) lamp failure detector means connected to the protection switch for opening the same when the lamp remains unlit for a predetermined time following the closure of the lamp switch.

8. The lamp lighting circuit of claim 7 further comprising means connected to the protection switch for holding the same open when the lamp switch is closed with the power supply connected in the wrong polarity between the pair of input terminals.

9. A lamp lighting circuit for connection between a power supply and an electric lamp, comprising:
   (a) a pair of input terminals between which the power supply is to be connected;
   (b) a pair of output terminals between which the lamp is to be connected;
   (c) a booster circuit connected between the input and output terminals for variably boosting the output voltage of the power supply;
   (d) an operator actuated lamp switch connected between the input terminals and the booster circuit;
   (e) a protection switch connected in series with the lamp switch;
   (f) a circuit breaker connected between the input terminals and the booster circuit and also connected to the protection switch for permitting the power supply to power the lamp when both the lamp switch and the protection switch are closed; and
   (g) booster output detector means connected between the output of the booster circuit and the protection switch for opening the protection switch in response to a prescribed abnormal state in the output from the booster circuit, the circuit breaker responding to the opening of the protection switch by electrically disconnecting the power supply from the booster circuit.

10. The lamp lighting circuit of claim 9 wherein the booster output detector means, after having once opened the protection switch, holds the same open pending the reclosure of the lamp switch.

11. The lamp lighting circuit of claim 9 wherein the booster output detector means comprises:
    (a) current detector means for detecting the output current of the booster circuit; and
    (b) overcurrent detector means connected to the current detector means for opening the protection switch when the output current of the booster circuit exceeds a predetermined value.

12. The lamp lighting circuit of claim 9 wherein the booster output detector means opens the protection switch when the output voltage of the booster circuit maintains a predetermined maximum value for a prescribed time.

13. The lamp lighting circuit of claim 9 further comprising lamp failure detector means comprising:
    (a) lamp current detector means for detecting a lamp current flowing through the lamp when the same is lit up following the closure of the lamp switch, the lamp current detector means providing an output signal indicative of the unlit state of the lamp;
    (b) measuring means responsive to the output signal of the lamp current detector means for measuring the time during which the lamp remains unlit following the closure of the lamp switch; and
    (c) actuating means for opening the protection switch when the lamps remains until for a prescribed time.

14. The lamp lighting circuit of claim 9 further comprising supply overvoltage detector circuit for opening the protection switch when the output voltage of the power supply exceeds a predetermined value.

15. The lamp lighting circuit of claim 14 wherein the supply overvoltage detector means recloses the protection switch when the output voltage of the power supply drops below the predetermined value.

16. A lamp lighting circuit for connection between a power supply and an electric lamp, comprising:
    (a) a pair of input terminals between which the power supply is to be connected;
    (b) a pair of output terminals between which the lamp is to be connected;
    (c) a booster circuit connected between the input and output terminals for variably boosting the output voltage of the power supply;
    (d) an operator actuated lamp switch connected between the input terminals and the booster circuit;
    (e) a protection switch connected in series with the lamp switch;
    (f) a relay coil connected in series with the lamp switch and protection switch whereby the relay coil is energized only when both lamp switch and protection switch are closed;
    (g) a relay switch connected between the input terminals and the booster circuit and actuated by the relay coil for closing the lighting circuit when the relay coil is energized;
    (h) supply overvoltage detector means connected to the protection switch for opening the same when the output voltage of the power supply exceeds a predetermined value;
    (i) lamp failure detector means connected to the protection switch for opening the same when the lamp remains unlit for a predetermined time following the closure of the lamp switch;
    (j) booster overcurrent detector means connected to the protection switch for opening the same when the output current of the booster circuit exceeds a predetermined value; and (k) booster overvoltage detector means connected to the protection switch for opening the same when the output voltage of the booster circuit maintains a predetermined maximum value for a prescribed time.

17. The lamp lighting circuit of claim 16 further comprising means connected to the protection switch for holding the same open when the lamp switch is closed with the power supply connected in the wrong polarity between the pair of input terminals.

* * * * *